United States Patent Office 3,450,750
Patented June 17, 1969

3,450,750
[4-[2-(ALKOXYMETHYL)ALKANOYL]PHENOXY] ACETIC ACIDS AND DERIVATIVES THEREOF
Edward J. Cragoe, Jr., Lansdale, Pa., assignor to Merck & Co., Inc., Rahway, N.J., a corporation of New Jersey
No Drawing. Filed July 27, 1966, Ser. No. 568,110
Int. Cl. C07c *65/02, 65/14*
U.S. Cl. 260—521          9 Claims

ABSTRACT OF THE DISCLOSURE

[4-[2-(alkoxymethyl)alkanoyl]phenoxy]acetic acid products which may be nuclear substituted by halogen, lower alkyl, lower alkoxy or 1,3-butadienylene; and the nontoxic, acid addition salts, alkyl esters and amide derivatives thereof. The compounds are useful as diuretics and saluretics and, therefore, have application in the treatment of conditions associated with electrolyte and fluid retention and hypertension.

The products are synthesized by treating a [4-(2-methylenealkanoyl)phenoxy]acetic acid with a lower alkanol in the presence of a base and the [4-[2-(alkoxymethyl)methyl]phenoxy]acetate thus formed may then be isolated or, if desired, the said salt may be converted to the free acid or to its corresponding ester or amide derivative by conventional means.

---

This invention relates to a new class of chemical compounds which can be described generally as [4-[2-(alkoxymethyl)alkanoyl]phenoxy]acetic acids and to the nontoxic, pharmacologically acceptable salts, esters and amide derivatives thereof.

Also, it is an object of this invention to describe a novel method of preparation for the instant [4-[2-(alkoxymethyl)alkanoyl]phenoxy]acetic acids, their salts, esters and amides.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general, alleviate conditions usually associated with edema.

The products of this invention are compounds having the following general formula:

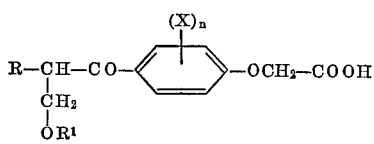

I wherein R is alkyl, for example, lower alkyl such as methyl, ethyl, propyl, isopropyl, butyl, pentyl, etc.; R¹ is lower alkyl, for example, methyl, ethyl, n-propyl, n-butyl, isobutyl, n-pentyl, etc.; the X radicals are similar or dissimilar members selected from hydrogen, halogen, lower alkyl, lower alkoxy or, taken together, two X radicals on adjacent carbon atoms of the benzene ring may be joined to form a 1,3-butadienylene chain, i.e.,

—CH=CH—CH=CH— and $n$ is an integer having a value of 1–2; and the salts thereof derived from nontoxic, pharmacologically acceptable bases such as the alkali metal or alkaline earth metal hydroxides, carbonates, bicarbonates, etc.

A preferred embodiment of this invention relates to [4-[2-(alkoxymethyl)alkanoyl]phenoxy]acetic acids having the following general formula:

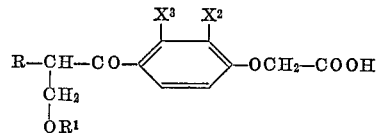

wherein $X^2$ and $X^3$ are similar or dissimilar members selected from hydrogen, halogen and lower alkyl and R and $R^1$ are as defined above; and to the nontoxic, pharmacologically acceptable salts thereof. The foregoing class of compounds exhibits particularly good diuretic and saluretic activity and represents a preferred subgroup of compounds within the scope of this invention.

The products of this invention are conveniently prepared by the reaction of a [4-(2-methylenealkanoyl)phenoxy]acetic acid with alkanol in the presence of a base and the [4-[2-(alkoxymethyl)alkanoyl]phenoxy]acetic acid salt (Ia, infra) thus formed may be isolated as such or, if desired, may be converted to the corresponding carboxylic acid product (I) by treating the aforementioned salt (Ia) with an aqueous solution of an acid such as hydrochloric acid. The base employed in the process may be any one of a wide variety of basic reagents but, in practice, it is most desirable to use the alkali metal salt of the alkanol reactant, i.e., the corresponding alkali metal alkoxide, which can be prepared by the addition of alkali metal, such as sodium, to the alkanol reagent. The following equation, wherein the base employed is sodium alkoxide, illustrates this method of preparation; however, it is to be understood that other basic reagents can also be employed in a similar manner to yield an identical product:

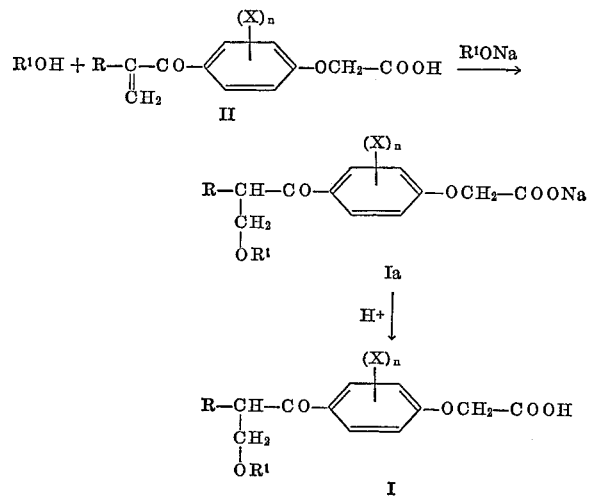

wherein R, $R^1$, X and $n$ are as defined above and $H^+$ is the cation derived from an organic or inorganic acid such as hydrochloric acid, etc.

The [4-[2-(alkoxymethyl)alkanoyl]phenoxy]acetic acid salts of this invention are generally obtained as crystalline solids and, if desired may be purified by recrystallization from a suitable solvent such as a mixture of methanol and ether.

The [4-(2-methylenealkanoyl)phenoxy]acetic acids (II) which are employed as starting materials in the process of this invention, and the method for their preparation, are described in Patent No. 3,255,241, issued June 7, 1966.

This invention also relates to the ester and amide derivatives of the instant products (I) and includes all such derivatives as are compatible with the body system and whose pharmological properties will not cause an adverse physiological effect. Esters and amides within the scope of this invention include, for example, the alkyl ester and the amide, monoalkylamide, dialkylamide and heterocyclic amide derivatives as, for example, amides derived from such heterocyclic amines as pyrrolidine, piperidine, morpholine, etc.; which esters and amides are prepared in a manner similar to that described above for the preparation of the carboxylic acid products (I) by substituting the appropriate ester or amide starting material for the [4-(2-methylenealkanoyl)phenoxy]acetic acid reactant (II) depicted in the preceding equation.

The foregoing and other equivalent methods for the preparation of the ester and amide derivatives of the instant products will be apparent to those having ordinary skill in the art and, to the extent that the said derivatives are both nontoxic and physiologically acceptable to the body system, the said esters and amides are the functional equivalent of the corresponding [4-[2-(alkoxymethyl)-alkonyl]phenoxy]acetic acid products (I).

The examples which follow illustrate the [4-[2-(alkoxymethyl)alkanoyl]phenoxy]acetic acids, the salts thereof, and the methods by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1.—SODIUM [2,3 - DICHLORO - 4-[(2-METHOXYMETHYL)BUTYRYL]PHENOXY]ACETATE

Step A: [2,3-dichloro-4-[(2-methoxymethyl)butyryl]phenoxy]acetic acid

To a stirred solution of sodium methoxide in methanol, prepared from sodium metal (1.84 g.; 0.08 g. atom) in anhydrous methanol (120 ml.), is added [2,3-dichloro-4-(2-methylenebutyryl)phenoxy]acetic acid (12.12 g.; 0.04 mole). After standing 48 hours at room temperature, the solution is filtered and the solvent is distilled at reduced pressure. The crude product is dissolved in water (100 ml.), acidified with hydrochloric acid and extracted into ether (200 ml.). The ether solution is dried over magnesium sulfate and then the ether is removed by distillation at reduced pressure to yield an oil identified as [2,3 - dichloro - 4-[(2-methoxymethyl)butyryl]phenoxy]acetic acid.

Step B: Sodium [2,3-dichloro-4-[(2-methoxymethyl)butyryl]phenoxy]acetate

The [2,3-dichloro-4-[(2-methoxymethyl)butyryl]phenoxy]acetic acid obtained in Step A is dissolved in ethanol (100 ml.) and neutralized with an ethanolic solution of sodium hydroxide. The product which separates is identified as sodium [2,3-dichloro-4[(2-methoxymethyl)butyryl]phenoxy]acetate and, upon recrystallization from a mixture of methanol and ether, has a melting point of 215° C.

*Analysis.*—Calculated for $C_{14}H_{15}Cl_2O_5Na$: C, 47.08; H, 4.23; Cl, 19.85. C, 4.93; H, 4.20; Cl, 20.05.

EXAMPLE 2.—SODIUM [2,3 - DIMETHYL - 4-[(2-METHOXYMETHYL)BUTYRYL]PHENOXY]ACETATE

By substituting [2,3-dimethyl-4-(2-methylenebutyryl)phenoxy]acetic acid for the [2,3,-dichloro-4-(2-methylene butyryl)phenoxy]acetic acid for Example 1 and following the procedure described therein, the product sodium [2,3 - dimethyl - 4-[(2-methoxymethyl)butyryl]phenoxy]acetate is obtained.

In a manner similar to that described in Example 1, Steps A and B, for the preparation of [2,3-dichloro-4-[(2-methoxymethyl)butyryl]phenoxy]acetic acid and sodium [2,3 - dichloro - 4-[(2-methoxymethyl)butyryl]phenoxy] acetate, respectively, all of the products of this invention may be obtained. Thus, by substituting an appropriate [4-2-methylenealkanoyl)phenoxy]acetic acid (II) for the [2,3-dichloro-4-(2-methylenebutyryl)phenoxy]acetic acid of Example 1 and following substantially the procedure described therein all of the [4-[2-(alkoxymethyl)alkanoyl]phenoxy]acetic acids of this invention and their corresponding salts may be obtained. The following equation, wherein H+ is as defined above, illustrates the reaction of Example 1, Steps A and B, and, together with Table I (infra), depict the [4-(2-methylenebutyryl)phenoxy]acetic acid starting materials (IIa, infra) of the instant process and the corresponding products (Ib and Ic, infra) derived therefrom:

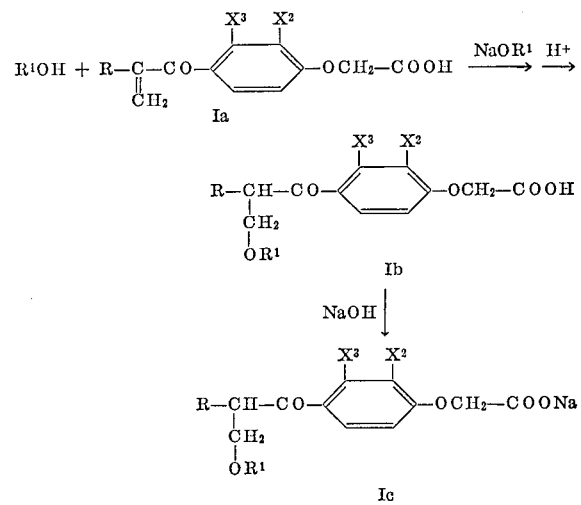

TABLE

| Ex. | R | R¹ | X² | X³ |
|---|---|---|---|---|
| 3 | —C₂H₅ | —C₂H₅ | H | Cl |
| 4 | —C₂H₅ | —CH₃ | —CH=CH—CH=CH— | |
| 5 | —CH(CH₃)₂ | —(CH₂)₂CH₃ | H | Cl |
| 6 | —C₂H₅ | —(CH₂)₄CH₃ | Cl | —CH₃ |
| 7 | —C₂H₅ | —CH₂—CH(CH₃)₂ | —CH₃ | Cl |
| 8 | —CH(CH₃)₂ | —CH₃ | Cl | Cl |
| 9 | —C₂H₅ | —(CH₂)₃CH₃ | H | —OCH₃ |
| 10 | —CH³ | —C₂H₅ | H | H |

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 100 mg. of a [4-[2-(alkoxymethyl)alkanoyl]phenoxy]acetic acid or a suitable salt, ester or amide derivative thereof, with 94 mg. of lactose and 6 mg. of magnesium stearate, and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 11.—DRY-FILLED CAPSULES CONTAINING 100 MG. OF ACTIVE INGREDIENT PER CAPSULE

|  | Per capsule, mg. |
|---|---|
| Sodium [2,3-dichloro-4-[(2-methoxymethyl)butyryl]phenoxy]acetate | 100 |
| Lactose | 94 |
| Magnesium stearate | 6 |
| Capsule size No. 3 | 200 |

The sodium [2,3 - dichloro - 4 - [(2 - methoxymethyl) butyryl]phenoxy]acetate is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the [4-[2 - (alkoxymethyl)alkanoyl]phenoxy]acetic acid products of this invention and their salt, ester and amide derivatives constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound having the formula:

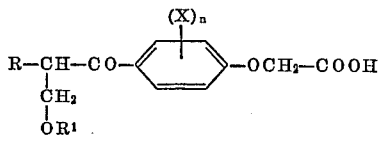

wherein R is lower alkyl; $R^1$ is lower alkyl; the X radicals are similar or dissimilar members selected from hydrogen, halogen, lower alkyl, lower alkoxy or, taken together, two X radicals on adjacent carbon atoms of the benzene ring may be joined to form 1,3-butadienylene and $n$ is an integer having a value of 1–2; and the nontoxic, pharmacologically acceptable salts, alkyl esters and amide, monoalkylamide, dialkylamide, pyrrolidide, piperidide and morpholide derivatives thereof.

2. A compound having the formula:

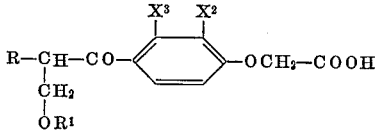

wherein R is lower alkyl; $R^1$ is lower alkyl and $X^2$ and $X^3$ are similar or dissimilar members selected from hydrogen, halogen and lower alkyl; and the nontoxic, pharmacologically acceptable salts thereof.

3. The product of claim 2 wherein $X^2$ and $X^3$ are halogen.

4. The product of claim 2 wherein $X^2$ and $X^3$ are lower alkyl.

5. The product of claim 2 wherein $X^2$ is hydrogen and $X^3$ is halogen.

6. Sodium [2,3 - dichloro-4-[2-(methoxymethyl)butyryl]phenoxy]acetate.

7. [2,3 - dichloro - 4 - [2 - (methoxymethyl)butyryl]phenoxy]acetic acid.

8. Sodium [2,3 - dimethyl-4-[2-(methoxymethyl)butyryl]phenoxy]acetate.

9. Sodium [3-chloro-4-[2 - (methoxymethyl)butyryl]phenoxy]acetate.

References Cited

UNITED STATES PATENTS

| 3,255,242 | 6/1966 | Schultz et al. | 260—521 |
| 3,255,241 | 6/1966 | Bolhofer et al. | 260—521 |

OTHER REFERENCES

Wagner and Zook: Synthetic Organic Chemistry (1953), pp. 232–33.

LORRAINE A. WEINBERGER, *Primary Examiner.*

JAMES NIELSEN, *Assistant Examiner.*

U.S. Cl. X.R.

260—247.7, 294.7, 326.5, 473, 501.1, 520, 559; 424—308, 317, 324